UNITED STATES PATENT OFFICE.

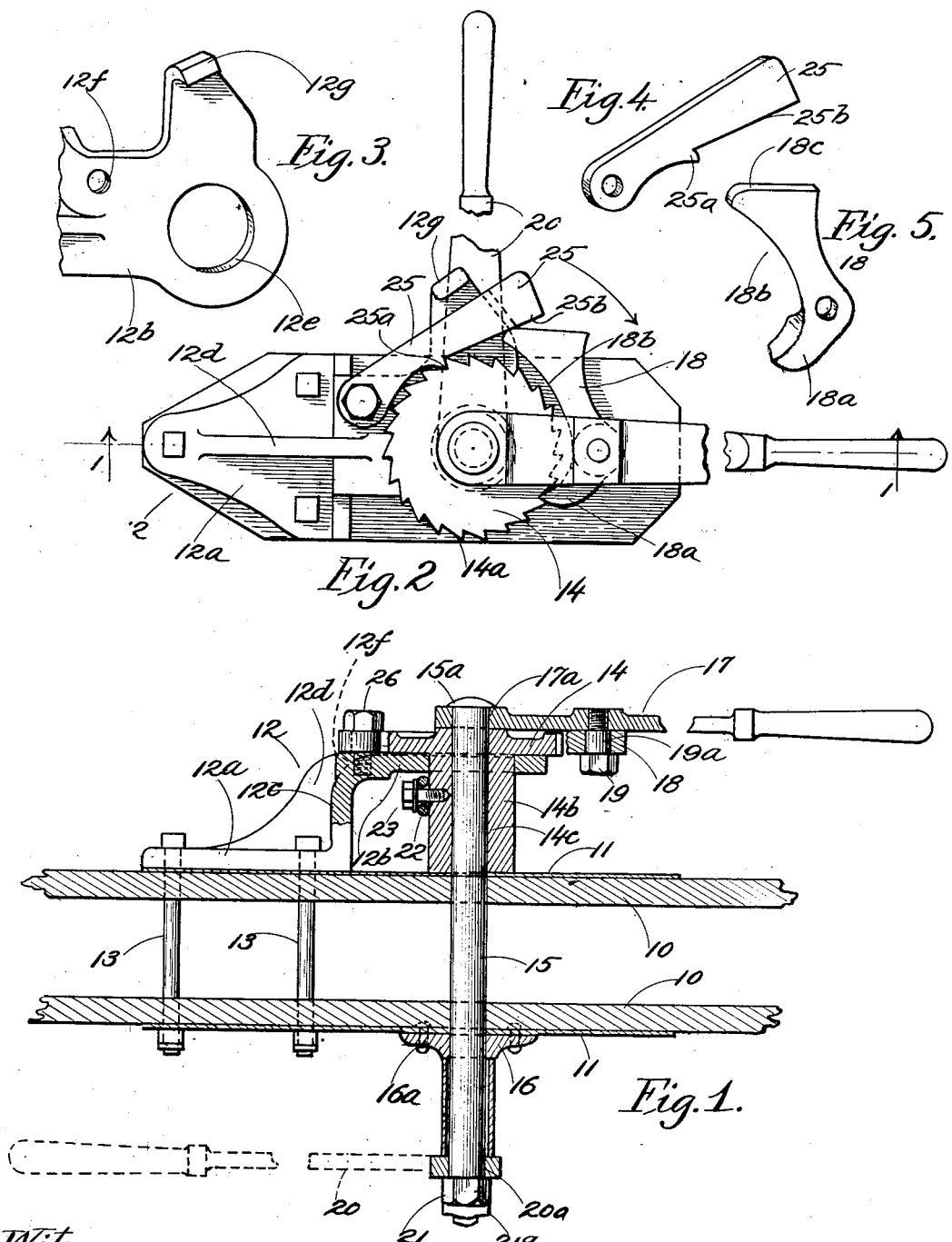

JAMES A. CARNEY, OF AURORA, ILLINOIS.

HAND-BRAKE-OPERATING MECHANISM.

1,328,493.　　　　Specification of Letters Patent.　　Patented Jan. 20, 1920.

Application filed June 4, 1914. Serial No. 843,004.

*To all whom it may concern:*

Be it known that I, JAMES A. CARNEY, a citizen of the United States, residing at Aurora, in the county of Kane and State of Illinois, have invented certain new and useful Improvements in Hand-Brake-Operating Mechanism, of which the following is a specification.

This invention relates to improvements in hand brake operating mechanism and has for its object to provide improved mechanism of the class described especially adapted for use with cars having no platform or "blind end" cars. My invention comprises the use of two levers, one on each side of the end wall of a car, in combination with brake operating mechanism. By this means the brake may be operated from either the inside or outside of the car as is most convenient.

In addition I have provided means operating with the above described mechanism for effecting the release or engagement of the brake operating means. These features in combination with other specific elements constitute my invention, which is set forth in the following specification and shown in the accompanying drawings, in which—

Figure 1 is a horizontal section through an end wall of a car showing my mechanism applied thereto.

Fig. 2 is an end elevation of my invention from the outside of the car looking toward the end thereof.

Fig. 3 is a detail of the portion of the frame showing the stop; and

Figs. 4 and 5 are perspective detail views of the pawls.

Like numerals refer to like elements throughout the drawings, in which 10 designates a double end wall of a car having plates 11 attached thereto, as shown in Fig. 1. A frame member, generally indicated by the numeral 12, is located on the outer side of the end wall 10 and is provided with the base portion $12^a$, which is bolted to the end wall by the bolts 13 extending therethrough.

The frame 12 further comprises a bearing portion $12^b$ offset with respect to the base portion $12^c$ and connected thereto by the integrally formed elbow $12^e$ a flange or rib $12^d$ being provided for strength and rigidity. The bearing portion $12^b$ is provided with the circular aperture $12^e$ and with the threaded aperture $12^f$, as shown in Fig. 3, for example, and is further formed with the inwardly projecting stop, or shoulder, $12^g$, all for a purpose to be hereinafter described.

A ratchet 14 is provided having the usual teeth $14^a$ and provided with the elongated hub $14^b$ on one side thereof. This hub is centrally apertured at $14^c$ as shown in Fig. 2.

A shaft 15 extends through the double end wall 10 and is journaled at one side thereof in the bearing ring 16 secured to the wear plate 11 by rivets $16^a$. This shaft extends through the aperture $14^c$ in the elongated hub $14^b$ and ratchet 14 and is rotatably mounted thereon.

An operating handle, or lever, 17 is located on the outer side of the end wall 10 being provided with an aperture $17^a$ and being keyed or otherwise fixed on the shaft 15 adjacent the end thereof, which is overturned, or enlarged, as indicated by the numeral $15^a$, this head, or overturned portion $15^a$, serving to prevent accidental displacement of the lever 17. To the latter is attached the pawl 18 by means of a cap screw 19 and bearing shoulder $19^a$, as shown in Fig. 1. This pawl is considerably heavier at its end $18^a$, as shown in Fig. 5, for a purpose to be hereinafter described, and it is concave or curved on its inner side, as indicated by the numeral $18^b$. At its upper end the pawl 18 is provided with the cam face $18^c$.

Adjacent the other end of the shaft 15 is located a second operating lever 20 located inside the car and fitting over at $20^a$ the end of the shaft 15 to which it is keyed or suitably secured. A sleeve fits around the shaft 15 without contacting therewith and extends from the bearing rings 16 to the operating lever 20, as shown in Fig. 1, insuring against longitudinal displacement of the shaft 15. A nut 21 is threaded on the end of the shaft 15 and serves to hold the lever 20 thereon as well as prevent the removal of the shaft. A lock-nut $21^a$ serves to retain the nut 21 against accidental displacement.

It will be apparent that suitable movement of either of the levers 17 or 20 in the direction indicated by the arrow in Fig. 2 through the medium of pawl 18 will serve to rotate the ratchet 14 in a corresponding direction. The elongated hub $14^b$ has secured thereto one end of a chain 22 by means of a set screw 23, or the like. (See Fig. 1.) This chain may be connected with any suitable brake operating mechanism, this not forming a part of the present invention. It will be apparent that rotation of the ratchet 14 will cause the elongated hub 14<sup>b</sup> to act as a drum in winding up the chain 22, which will operate the brake operating mechanism not shown. This drum and ratchet 14<sup>b</sup> and 14 are suitably journaled in the aperture 12<sup>e</sup> of the frame 12, as is clearly shown in the drawings. To hold the same against unwinding, or release, of the brake operating mechanism, I provide a second pawl 25 having the engaging lug 25<sup>a</sup> and pivoted upon the cap screw 26, which is threaded into aperture 12<sup>f</sup> of frame 12. This pawl 25 is provided with a cam under surface 25<sup>b</sup>. When the device is in assembled relation, the engaging end of the pawl 18 being heavier than the upper end thereof, it will normally remain in engagement with the ratchet 14 and by virtue of its arrangement the pawl 25 will likewise normally remain in engagement with the ratchet 14, both as shown in Fig. 2 of the drawing. This engagement is such as to permit rotation in the direction of the arrow of the levers and ratchet 14 to set the brake mechanism. This setting may be accomplished either from the inside or outside of the car, which is a great advantage, especially in connection with cars without platforms. To provide for the release of the mechanism, I have provided the pawls 18 and 25 so that the upper cam surface of the pawl 18 will normally contact with the cam surface 25<sup>b</sup> of the pawl 25 in the position shown in Fig. 2, this contact being such as to permit their normal engagement with the ratchet 14. When it is desired to release the mechanism, however, either of the levers 17 or 20 is moved upwardly in a direction opposite to that indicated by the arrow in Fig. 2 and during this movement the cam surface 18<sup>c</sup>, coacting with the cam surface 25<sup>b</sup>, will operate to force both pawls out of engagement with the ratchet, as will be obvious, this release movement of the pawls being continued until limited by the stop 12<sup>g</sup> of frame 12.

It will be obvious that my structure is simple to manufacture and install and efficient in operation and that it may be readily operated from either side of the wall of the car. The levers are preferably arranged in their normal positions with the outside lever hanging vertically downward and the inside lever standing vertically upright. If the brake is to be operated from the outside of the car only, the inside lever can be omitted, and if the brake is to be operated from the inside only, the outside lever can be omitted. In the operation of the levers it is to be noted that an intermittent, or oscillating, movement is employed to effect setting of the brakes. While I have shown and described a specific embodiment of my invention, I wish to be understood as not desiring to be restricted to the form shown and described beyond the scope of the appended claims.

What I claim is:—

1. In a device of the class described, a bracket adapted to be attached to a car wall and having an offset bearing portion, a drum rotatably mounted in said bearing portion and extending therefrom toward said car wall, a shaft extending through said drum, a ratchet carried by said drum, a lever mounted on said shaft, a gravity actuated pawl pivoted on said lever normally to engage said ratchet, whereby said ratchet will be rotated upon proper movement of the lever, and a gravity actuated detent to prevent reverse rotation of the ratchet.

2. A ratchet actuating mechanism comprising in combination a shaft, supports in which said shaft is rotatably mounted, a hand lever secured to said shaft, a pawl pivotally carried by said lever, a drum rotatably mounted on said shaft, a ratchet wheel attached to said drum and having its peripheral teeth lying in the path of said pawl, a locking pawl carried by the shaft support and normally engaging the the teeth of the ratchet wheel to prevent backward rotation of said drum, and means for rotating said shaft and thereby operating said lever.

3. A ratchet actuating mechanism comprising in combination a shaft, supports in which said shaft is rotatably mounted, a hand lever secured to said shaft, a pawl pivotally carried by said lever, a drum rotatably mounted on said shaft, a ratchet wheel attached to said drum and having its peripheral teeth lying in the path of said pawl, a locking pawl carried by the shaft support and normally engaging the teeth of the ratchet wheel to prevent backward rotation of said drum, and a second lever fixed to said shaft at a point removed from said first-named lever, whereby said shaft may be rotated by said second-named lever and said first-named lever thereby operated.

4. In a device of the class described, a pivotally mounted lever, a ratchet, a pawl pivotally mounted on said lever to coact with said ratchet to rotate the same, said pawl being operative upon movement of said lever, a second pawl normally engaging said ratchet by gravity to prevent rotation thereof in one direction, means actuated by the movement of said lever for disengaging both of said pawls upon proper movement of said lever, and a fixed stop arranged to engage one of said pawls upon said disengaging movement of said lever.

5. In a device of the class described, a pairs of levers arranged for mounting one on each side of a car wall, ratchet and drum mechanism, and means for operating said ratchet and drum upon movement of either of said levers, said means comprising a pawl pivotally attached to one of said levers and arranged to normally engage said ratchet.

6. In a device of the class described, a pair of levers arranged for mounting one on each side of a car wall, ratchet and drum mechanism, means for operating said ratchet and drum upon movement of either of said levers, said means comprising a pawl pivotally attached to one of said levers and arranged to normally engage said ratchet, and a second pawl coacting with said ratchet to normally prevent rotation of said ratchet in one direction.

7. In a device of the class described, a pair of levers arranged for mounting one on each side of a car wall, ratchet and drum mechanism, means for operating said ratchet and drum upon movement of either of said levers, said means comprising a pawl pivotally attached to one of said levers and arranged to normally engage said ratchet, and a second pawl coacting with said ratchet to normally prevent rotation of said ratchet in one direction, said pawls being arranged so that proper movement of either of said levers will operate to disengage them.

8. In a device of the class described, a shaft adapted to extend through a car wall, a lever secured to said shaft adjacent each end thereof, a ratchet and drum loosely mounted on said shaft, a pawl pivotally attached to one of said levers and arranged to normally engage said ratchet to effect rotation thereof when said lever is moved in one direction, a second pawl pivotally mounted and coacting with said ratchet to normally prevent return rotation thereof, said pawls being arranged so that proper movement of either of said levers will cause said first named pawl to coact with said second named pawl to release both thereof.

9. In a device of the class described, a shaft adapted to extend through a car wall, a lever secured to said shaft adjacent each end thereof, a ratchet and drum loosely mounted on said shaft, a pawl pivotally attached to one of said levers and arranged to normally engage said ratchet to effect rotation thereof when said lever is moved in one direction, a second pawl pivotally mounted and coacting with said ratchet to normally prevent return rotation thereof, said pawls being arranged so that proper movement of said lever will cause said first named pawl to coact with said second named pawl to release both thereof, and means to limit said release movement of said pawls.

10. In a device of the class described, a frame comprising a base portion and an offset portion, said base portion being arranged for attachment to a car, a ratchet having a drum portion and rotatably mounted in said offset frame portion, a shaft extending through said drum and ratchet and mounted to rotate relative thereto, levers attached to said shaft on either side of said ratchet, and means coacting with said levers, shaft and ratchet to rotate the last named upon proper movement of the first named.

11. In a device of the class described, a pair of levers arranged for mounting, one on each side of a car wall, ratchet and drum mechanism, means for operating said ratchet and drum upon movement of either of said levers, and means to permit detachment of either of said levers.

12. A ratchet actuating mechanism comprising in combination a shaft, supports in which said shaft is rotatably mounted, a hand lever secured to said shaft, a pawl pivotally carried by said lever, a drum rotatably mounted on said shaft, a ratchet wheel attached to said drum and having its peripheral teeth lying in the path of said pawl, a locking pawl carried by the shaft support and normally engaging the teeth of the ratchet wheel to prevent backward rotation of said drum, and means for rotating said shaft and thereby operating said lever, said second-named pawl being arranged in the path of the hand-lever and adapted to be disengaged from the ratchet by abnormal throw of the lever in non-winding direction.

In testimony whereof, I have subscribed my name.

JAMES A. CARNEY.

Witnesses:
ALBERT H. OSTBERG,
ELBERT J. BABBITT.